United States Patent [19]

Bosen et al.

[11] Patent Number: 4,545,925

[45] Date of Patent: Oct. 8, 1985

[54] CORROSION INHIBITED FREEZE PROTECTED HEAT TRANSFER FLUID

[75] Inventors: Sidney F. Bosen, Joliet; Bruce D. Perlson, Morris, both of Ill.

[73] Assignee: Norchem, Inc., Omaha, Nebr.

[21] Appl. No.: 607,800

[22] Filed: May 7, 1984

[51] Int. Cl.[4] ............................................. C23F 11/00
[52] U.S. Cl. ................................ 252/389 A; 252/392; 252/396; 422/16
[58] Field of Search .................... 252/389.2, 392, 396; 422/16, 18

[56] References Cited

U.S. PATENT DOCUMENTS

| | | | |
|---|---|---|---|
| 3,090,757 | 5/1963 | Berger | 252/75 |
| 3,414,519 | 12/1968 | Suffern | 252/75 |
| 3,445,395 | 5/1969 | Boehmer | 252/75 |
| 3,769,220 | 10/1973 | Willard et al. | 252/75 |

FOREIGN PATENT DOCUMENTS 1210370 10/1970 United Kingdom .

*Primary Examiner*—Paul Lieberman
*Assistant Examiner*—Willie Thompson
*Attorney, Agent, or Firm*—Donald F. Haas

[57] ABSTRACT

An improved corrosion inhibited, freeze protected, heat transfer fluid or antifreeze composition which is comprised of at least about 0.25 weight percent phosphate as $PO_4$, greater than 0.025 weight percent nitrite as $NO_2$, and the balance a polyhydroxy alcohol; with the proviso that nitrate not be present in the heat transfer fluid. When the heat transfer fluid is to be used as an antifreeze composition for internal combustion engines, it can also contain a corrosion inhibitor selected from the group consisting of 2-mercaptobenzotriazole, tolyltriazole, benzotriazole, and alkali metal salts thereof and a buffering agent.

4 Claims, No Drawings

CORROSION INHIBITED FREEZE PROTECTED HEAT TRANSFER FLUID

BACKGROUND OF THE INVENTION

The present invention is a composition of a method for use as a corrosion inhibited, freeze protected, heat transfer fluid. More particularly, the composition is a polyhydroxy alcohol-based, especially ethylene glycol-based, antifreeze composition which is designed to protect internal combustion engines and other devices from corrosion. A preferred use of the composition of the present invention is in applications wherein freeze protection is desired but there is no mechanical circulation of the heat transfer fluid.

Generally, water is the accepted heat exchange medium for the circulating cooling systems of internal combustion engines. It is also widely used as the heat transfer medium in non-circulating systems such as natural gas heaters which are used to prevent freezing of moisture in natural gas pipelines. The heater is a large right cylndrical vessel typically two to three feet in diameter with a tube inside which has a flame. Also inside are tubes which carry the moist gas which is to be heated. The vessel is filled with the heat transfer fluid. The main corrosion problem in such applications is the corrosion of the ferrous metals from which the vessel and the tubes are made.

Ethylene glycol is the polyhydroxy alcohol which is widely used to lower the freezing point of water and to raise its boiling point to enable the heat exchange medium to be used over a wider range of temperatures. Ethylene glycol and other such antifreezes tend to corrode the metals from which engines and heaters are made. Therefore, it has been necessary to add corrosion inhibitor compositions to the antifreeze solutions to lessen the corrosive effect of the solutions. British Pat. No. 1,210,370 discloses an antifreeze composition for use as the heat exchange medium for the cooling system of an internal combustion engine. This composition is comprised of a water soluble alcohol, an alkali metal nitrate, an alkali metal borate, a phosphate, a heterocyclic benzo-compound, and, optionally, an alkali metal nitrite. This composition differs from the composition of the present invention in that in the present invention, borate is not necessary and nitrate is to be avoided.

SUMMARY OF THE INVENTION

The present invention relates to an antifreeze composition which is comprised of at least about 0.25 weight percent phosphate as $PO_4$, greater than 0.025 weight percent nitrite as $NO_2$, and the balance a polyhydroxy alcohol. It is critical to the performance of this invention that nitrate not be present in this composition. The present invention also relates to an antifreeze composition which can be used specifically for internal combustion engines and other heat transfer devices which contain ferrous metals, copper and copper alloys, and solder in the systems. This composition comprises the above components with the addition of a corrosion inhibitor selected from the group consisting of 2-mercaptobenzotriazole, tolyltriazole, benzotriazole and alkali metal salts thereof, and a buffering agent.

DETAILED DESCRIPTION OF THE INVENTION

The improved corrosion inhibited, freeze protected, heat transfer fluid or antifreeze composition of the present invention is particularly useful in applications where there is no mechanical circulation of the heat transfer fluid such as in stand-by internal combustion engines and other devices. One such application is the natural gas heater discussed above. Stagnation of the heat transfer fluid makes corrosion inhibition much more difficult because of localized corrosion. The main problem in such applications is the corrosion of the ferrous metals from which the vessel and the tubes are made.

It is very important to the performance of the present invention that the antifreeze composition contain at least 0.25 weight percent phosphate as $PO_4$. If less than that amount of phosphate is used, then the corrosion protection for the ferrous metals is unacceptable. It has been found that there is no effective upper limit for the phosphate concentration. The more phosphate that is added, the better the corrosion protection. The only practical limitation is the solubility of the phosphate in the antifreeze composition. The phosphate can be present in any of its various forms. The cation can be sodium, potassium or ammonium.

Again, it is very important to the performance of the composition of the present invention that greater than 0.025 weight percent nitrite as $NO_2$ be present in the composition. If the concentration of the nitrite is less than that amount, then the corrosion inhibition is unacceptable. Nitrite is effective in inhibiting localized corrosion which generally is the manner in which the ferrous metals corrode in natural gas heaters. There is no upper limit on the effective concentration of nitrite. The more nitrite that is added, the better the corrosion protection. The only practical upper limit is the solubility of the nitrite in the antifreeze composition. An alkali metal such as sodium or potassium can be used as the cation with nitrite.

The balance of the antifreeze composition is a polyhydroxy alcohol. Such alcohols include ethylene glycol, propylene glycol, diethylene glycol, but preferably ethylene glycol. It must be noted that a base, such as potassium hydroxide, might have to be added to this composition to adjust the pH of the composition within an acceptable range. For the applications contemplated herein, the acceptable range for pH is 7 to 11. Finally, small amounts of water may be used as a solubilizing agent for the components.

No nitrate can be present in the antifreeze composition of the present invention. It has been found that the presence of nitrate interferes with the anticorrosion activity of the nitrite. Only very small amounts of nitrate, significantly less than 0.1 weight percent, can be present or the full advantages of the present invention will not be achieved.

The composition of the present invention can also be used to advantage as the heat transfer medium for internal combustion engines. Since such engines normally require inhibition for copper and brass, it is desirable to include in the composition a corrosion inhibitor selected from the group consisting of 2-mercaptobenzotriazole, tolyltriazole, benzotriazole, and alkali metal salts thereof. In order to provide sufficient corrosion protection from about 0.05 to about 0.5 weight percent of this corrosion inhibitor should normally be used.

Normally, an internal combustion engine heat transfer fluid requires the presence of sufficient buffering capacity to withstand intrusions of carbon dioxide from exhaust gases if gasket leaks occur and to overcome the acidic oxidation products of ethylene glycol. Additional phosphates can be added to the composition to provide the buffering capacity. Also, salts of borate, carbonate, bicarbonate, and organic mono and polycarboxylic acids can be used to provide the buffering capacity.

The following procedure was used to evaluate all of the coolant compositions in the following examples. Since ferrous metal corrosion is of the most importance for the present applications and cast iron is more susceptible to corrosion than carbon steel, new grey cast iron coupons were used for testing. Seven hundred and fifty milliliters of the test solution comprising 25% coolant concentrate and 75% ASTM standard corrosive water (100 parts per million chloride, 100 parts per million sulfate, and 100 parts per million bicarbonate, all sodium salts in deionized water) was placed on the test surface for five minutes. The test surface was forced to corrode by making it an anode versus a graphite cathode and passing a current density of 0.1 milliamps per square centimeter of exposed anode surface through the test surface. A salt bridge was placed 1-2 millimeters from the anode surface and the potential versus a standard calomel electrode (SCE) was recorded for one hour. The most negative potential recorded after initial equilibration was taken as the critical electrochemical pitting potential which is used as the measure of the effectiveness of the corrosion inhibitors. The more positive the critical electrochemical pitting potential, the better the corrosion inhibition.

EXAMPLE I

In this series of experiments, the effectiveness of the phosphate concentration was evaluated. Each of the coolants tested contained 94.85 weight percent ethylene glycol, 0.27 weight percent sodium nitrite, enough 45 weight percent aqueous potassium hydroxide solution to adjust the pH to between 8.8 and 9.2, and a small amount of water as both a solubilizing agent and to make a 100% solution with the varying amounts of phosphate. The phosphate concentration was varied and the source of the phosphate was orthophosphate from 75 weight percent aqueous phosphoric acid or dipotassium hydrogen phosphate. As can be seen, each of these experiments was repeated with an antifreeze concentrate which contained no sodium nitrite. The data in Table 1 below clearly shows that the coolants containing nitrite protect the cast iron from corrosion much better than the coolants which do not contain nitrite and that as more phosphate is added to the nitrite containing coolant, the critical electrochemical pitting potential, and therefore the corrosion inhibition, is increased.

TABLE 1

| | Critical Electrochemical Pitting Potential mv vs. SCE | | |
|---|---|---|---|
| Phosphate (wt. % as PO$_4$) | With 0.27 wt. % Sodium Nitrite | Without Sodium Nitrite | Difference (with-w/o) |
| 0.2494 | −430 | −500 | +70 |
| 0.4988 | −270 | −450 | +180 |
| 0.9975 | −250 | −430 | +280 |
| 1.4600 | −80 | −440 | +360 |

*All concentrates had 94.85 weight percent ethylene glycol and water added in addition to inhibitors to make 100%.

EXAMPLE II

In this series of experiments, a stepwise formulation of a coolant containing the different corrosion inhibitors discussed above was carried out. The base coolant used in the first experiment contained 94.85 weight percent ethylene glycol, 0.9975 weight percent phosphate as PO$_4$, 2.657 weight percent potassium hydroxide (95 weight percent aqueous solution), and sufficient water to add up to 100%. 0.27 weight percent sodium nitrite was added to the base coolant to formulate coolant No. 2. 0.6666 weight percent sodium 2-mercaptobenzothiazole (50 weight percent aqeueous solution) was added to coolant No. 2 to formulate coolant No. 3. Finally, 0.112 weight percent sodium tetraborate was added to coolant No. 3 to formulate coolant No. 4. The most significant increase in critical electrochemical pitting potential ($\Delta = 220$ millivolts), and thus corrosion protection is provided by the addition of 0.27 weight percent sodium nitrite. The addition of the sodium 2-mercaptobenzothiazole and the borate each increased the critical electrochemical pitting potential to a lesser extent. The performance of coolant Nos. 5 and 6 shows that sodium tolyltriazole or a mixture of sodium 2-mercaptobenzothiazole and sodium tolyltriazole can be substituted for sodium 2-mercaptobenzothiazole without any change in the critical electrochemical pitting potential. The results are shown in Table 2.

TABLE 2

| Sample | Coolant | Critical Electrochemical Pitting Potential mv vs. SCE |
|---|---|---|
| 1 | Base Coolant | −370 |
| 2 | Base Coolant plus nitrite | −150 |
| 3 | Base Coolant plus nitrite and 2-mercaptobenzothiazole | −70 |
| 4 | Base Coolant plus nitrite, 2-mercaptobenzothiazole and borate | −43 |
| 5 | Base Coolant plus nitrite, tolyltriazole and borate | −40 |
| 6 | Base Coolant plus nitrite, a mixture of 2-mercaptobenzothiazole and tolyltriazole, and borate | −50 |

EXAMPLE III

The following experiments were performed with coolant No. 4 for Example II except that the concentration of the sodium nitrite was varied. It can be seen from the data in Table 3 below, that the critical electrochemical pitting potential begins to increase between 0.025 and 0.03 weight percent of sodium nitrite. At 0.025 weight percent sodium nitrite, the solution is more corrosive than with no sodium nitrite. The data also indicate that there is no upper limit (excluding solubility) to the amount that may be added to improve corrosion protection of ferrous metals of sodium nitrite.

TABLE 3

| Sodium Nitrite, Weight Percent | Critical Electrochemical Pitting Potential mv vs. SCE |
|---|---|
| 0 | −370 |
| 0.025 | −390 |
| 0.030 | −370 |
| 0.040 | −340 |
| 0.050 | −330 |
| 0.10 | −240 |
| 0.20 | −90 |
| 0.27 | −43 |
| 0.40 | +150 |

TABLE 3-continued

| Sodium Nitrite, Weight Percent | Critical Electrochemical Pitting Potential mv vs. SCE |
| --- | --- |
| 4.0 | +1200 |

EXAMPLE IV

The experiments in this Example were performed using coolant No. 4 in Example II with the exception that a total of 0.4 weight percent of sodium nitrite and/or sodium nitrate was used in the coolants. It can be seen from examining Table 4 that where nitrate is substituted for nitrite, the critical electrochemical pitting potentials are significantly less than the critical electrochemical pitting potential when only 0.4 weight percent of sodium nitrite is used. This clearly shows that nitrate cannot be substituted nor interchanged for nitrite and that the presence of nitrate is deleterious to the effectiveness of the present invention.

TABLE 4

| Sodium Nitrite Weight Percent | Sodium Nitrate Weight Percent | Critical Electrochemical Pitting Potential mv vs. SCE |
| --- | --- | --- |
| 0.4 | 0 | +150 |
| 0.3 | 0.1 | −90 |
| 0.2 | 0.2 | −170 |
| 0.1 | 0.3 | −90 |
| 0 | 0.4 | −410 |

We claim:

1. An improved corrosion inhibited, freeze protected, heat transfer fluid which is comprised of:
   a. At least about 0.25 weight percent phosphate,
   b. Greater than 0.025 weight percent nitrite, and
   c. The balance a polyhydroxy alcohol; with the proviso that nitrate not be present in the heat transfer fluid.

2. A method for providing corrosion inhibition wherein a polyhydroxy alcohol based heat transfer fluid is utilized, comprising adding to said fluid:
   a. At least about 0.25 weight percent phosphate, and
   b. Greater than 0.025 weight percent nitrite; with the proviso that nitrate not be present in the heat transfer fluid.

3. An improved corrosion inhibited, freeze protected, heat transfer fluid for internal combustion engines and other heat transfer systems, which comprises:
   a. At least about 0.25 weight percent phosphate,
   b. Greater than 0.025 weight percent nitrite,
   c. A corrosion inhibitor selected from the group consisting of the 2-mercaptobenzotriazole, tolyltriazole, benzotriazole, and alkali metal salts thereof,
   d. A buffering agent, and
   e. The balance of polyhydroxy alcohol; with the proviso that nitrate not be present in the heat transfer fluid.

4. A method for providing corrosion inhibition wherein a polyhydroxy alcohol based heat transfer fluid is utilized, comprising adding to said fluid:
   a. At least about 0.25 weight percent phosphate,
   b. Greater than 0.025 weight percent nitrite,
   c. A corrosion inhibitor selected from the group consisting of the 2-mercaptobenzotriazole, tolyltriazole, benzotriazole, and alkali metal salts thereof, and
   d. A buffering agent; with the proviso that nitrate not be present in the heat fluid.

* * * * *